United States Patent [19]

Carden

[11] Patent Number: 5,712,014

[45] Date of Patent: *Jan. 27, 1998

[54] METAL MATRIX COMPOSITIONS FOR SUBSTRATES USED TO MAKE MAGNETIC DISKS FOR HARD DISK DRIVES

[75] Inventor: Robin A. Carden, Costa Mesa, Calif.

[73] Assignee: Alyn Corporation, Irvine, Calif.

[*] Notice: The term of this patent shall not extend beyond the expiration date of Pat. No. 5,486,223.

[21] Appl. No.: 674,140

[22] Filed: Jul. 1, 1996

[51] Int. Cl.$^6$ .................................................. G11B 5/82

[52] U.S. Cl. .............. 428/65.6; 428/539.5; 428/694 ST; 428/698; 428/900; 360/135

[58] Field of Search .................. 428/65.6, 539.5, 428/694 ST, 698, 900; 360/135

[56] References Cited

U.S. PATENT DOCUMENTS

| | | | |
|---|---|---|---|
| 4,605,440 | 8/1986 | Halverson et al. | 75/238 |
| 4,623,388 | 11/1986 | Jatkar et al. | 75/232 |
| 4,738,885 | 4/1988 | Matsumoto | 428/64 |
| 4,749,545 | 6/1988 | Begg et al. | 419/13 |
| 4,793,967 | 12/1988 | Pryor et al. | 419/19 |
| 4,825,680 | 5/1989 | Coe et al. | 72/359 |
| 4,946,500 | 8/1990 | Zedalis et al. | 75/232 |
| 4,961,778 | 10/1990 | Pyzik et al. | 75/230 |
| 5,039,633 | 8/1991 | Pyzik et al. | 501/93 |
| 5,045,278 | 9/1991 | Das et al. | 419/16 |
| 5,480,695 | 1/1996 | Tenhover et al. | 428/65.5 |
| 5,486,223 | 1/1996 | Cardew | 75/244 |
| 5,487,931 | 1/1996 | Annacone et al. | 428/64.1 |

OTHER PUBLICATIONS

"Magnetic film deposition for Winchester hard discs" in *The CD-ROM and Optical Disc Recording Systems* by E.W. Williams, Oxford University Press, 1994, pp. 86–88.

"Magnetic Recording" by J. Mallinson and R. Wood in *McGraw-Hill Yearbook of Science & Technology 1993*, McGraw-Hill, Inc., 1992, pp. 209–212.

*Primary Examiner*—Stevan A. Resan
*Attorney, Agent, or Firm*—Cooper & Dunham LLP

[57] ABSTRACT

A rigid disk substrate for a magnetic recording disk is formed of a boron carbide-metal matrix composite having a density ranging from 2.5 to 2.8 g/cm$^3$ and a composition ranging from approximately 1 to 40 weight % of boron carbide and 60 to 99 weight % of metal matrix. The substrate has a thickness less than 1 mm and exhibits negligible resonance characteristics at rotation speeds ranging from 0 through 12,000 rpm. The metal matrix is aluminum or an aluminum alloy. The boron carbide includes metal elements added to improve the chelating properties of the metal matrix material by forming intermetallic bonds with the metal matrix material.

9 Claims, 6 Drawing Sheets

METAL MATRIX COMPOSITIONS FOR SUBSTRATES USED TO MAKE MAGNETIC DISKS FOR HARD DISK DRIVES

BACKGROUND

The present invention relates generally to rigid disk substrates for use in magnetic recording applications. More specifically, the present invention relates to a substrate formed of a boron carbide-metal matrix composite material.

Personal computers have become common tools for data manipulation and data storage. Computers store and retrieve data using magnetic recording technology, where a magnetic film supported on a rigid disk substrate is used as the recording medium.

Magnetic recording involves use of a head, which includes a ring of magnetic material having a very narrow gap and a wire wrapped around the ring. To record or write information, a current is passed through the wire to generate a very intense field in the vicinity of the gap. If a recording medium is passed very close to the gap, it becomes permanently magnetized in response to the current. The recording is retrieved or played back by moving the recorded medium past the head and recovering the small voltage induced in the wire caused by a change in flux through the ring as the recorded magnetic information passes by the gap.

The storage capacity of typical magnetic recording disks used in personal computer hard disk drives has grown by over 70% per year from 1980 to 1991, and continues to have a high growth rate today. The density at which information can be recorded (written) and reproduced (read) on a disk surface is determined by the dimensions of the head and the accuracy with which the head can be positioned, by the magnetization level that can be achieved in the recording medium, and by the accuracy and sophistication of the reproduction electronics.

Data are recorded on the surface of a disk spinning typically at rotation speeds of approximately 5400 rpm. To avoid contact and wear, the head is designed as a slider that glides or flies just above the disk surface. By reducing the separation between the head surface and the recording medium very high linear track densities can be achieved, thus increasing the storage capacity of the disk.

Therefore, to maximize the resolution in writing and reading and hence maximize the storage capacity of a disk, it is necessary to have a very small head with a very small gap and a very narrow track width within which information is recorded. Most importantly, it is necessary to have an extremely small flying height or separation between the head surface and the recording medium. Both the field intensity during writing and the sensitivity during reading drop dramatically as the flying height increases beyond about one-third the length of the smallest piece of recorded information. In addition, future generations of recording heads may actually be designed to contact the disks during operation. Therefore, surface roughness of the disks is extremely critical, and surfaces must be optically smooth because the bit lengths are of the same order of magnitude as the wavelength of light. Further, disk resonance during rotation, described hereinbelow, must be eliminated.

As shown in FIG. 1, a typical magnetic recording disk 1 used today is comprised of a rigid disk substrate 3 made of an aluminum-magnesium (Al—Mg) alloy, a nickel-phosphorous (Ni—P) layer 5 covering the Al—Mg substrate, a magnetic recording layer 7 covering the Ni—P layer, and a carbon-based protective layer 9 covering the magnetic recording layer. The Ni—P layer 5 serves as a hard coating that protects the Al—Mg substrate and also is generally used for texturing the surface of the substrate 3 before the magnetic recording layer 7 is deposited. Texturing produces a grooved surface which assists and improves head aerodynamics.

A current trend in disk drive technology is to optimize rigid disk substrates by making them thinner, more rigid, and harder so that more disks can be stacked within a given space and also so that they can withstand handling when used in portable disk drives. Preferably, the substrates would have a high specific modulus of elasticity $E/\rho$, where E is the modulus of elasticity and $\rho$ is the density of the substrate material, at a substrate thickness that is less than 1 mm. A typical thickness of a conventional Al—Mg substrate ranges roughly from 0.6 to 0.9 mm. Hardness is important because a recording head is subject to head "slaps" or contacts with a spinning disk. These slaps can have a force of 500 to 1000 G. Head slaps are particularly prevalent in conventional Al—Mg substrates due to resonance at low rpm during acceleration from an idle state and also when the Al—Mg substrates reach higher rpm harmonic overtone resonance points. Because of resonance, a conventional substrate will not have a flat profile while spinning, but will have a slight wobble causing the substrate to slap the head if the amount of wobble exceeds the flying height of the head.

Other considerations in choosing an alternative and improved rigid disk substrate material is its compatibility with standard deposition processes used to deposit the various layers in a disk, including the Ni—P layer, the magnetic recording layer, and the protective coating layer.

In view of the above-mentioned problems and considerations, the present invention contemplates a metal matrix composite for rigid disk substrates comprised of a metal matrix material to which is added a ceramic material to improve mechanical properties including strength and hardness of the metal matrix material. As described hereinbelow, the metal matrix composite of the present invention is stronger, stiffer, and exhibits other significant improvements over material used in conventional Al—Mg rigid disk substrate material at a comparable cost.

A metal matrix composite material such as that contemplated by the present invention is described in U.S. Pat. No. 5,486,223, which is incorporated herein by reference.

In recent years metal matrix compositions or composites have become desirable materials because of improvements in stiffness, strength, and wear properties. Basic metal matrix composites are made typically with aluminum, titanium, magnesium, or alloys thereof as the metal matrix material. A selected percentage of ceramic material, within a specific range, is added to the metal matrix material to form the composite. Typical ceramic additives include boron carbide, silicon carbide, titanium diboride, titanium carbide, aluminum oxide, and silicon nitride.

Most known metal matrix composites are made by a conventional process that introduces the ceramic material into a molten metal matrix. In order for the improved properties to be realized, the molten metal generally must wet the ceramic material so that clumping of the ceramic material is minimized. Numerous schemes with varying degrees of success have been utilized to improve the dispersion of the ceramic material in the molten metal.

Recently, powder metallurgy consolidation has emerged as an attractive alternative method for fabricating metal matrix composites, where the powders are compacted by means of hot pressing and vacuum sintering to achieve a high density ingot. By following certain pressing and sintering techniques, an ingot of 99% theoretical density can be achieved.

One problem encountered in metal matrix composites of aluminum and silicon carbide is the thermodynamic instability of silicon carbide in molten aluminum. This instability leads to the formation of aluminum carbide precipitates at grain boundary interfaces and an increased concentration of silicon in the metal matrix during solidification from the molten state, and these occurrences are believed to have detrimental effects on the mechanical properties of the resulting composite.

An alternative and superior ceramic material for metal matrix composites is boron carbide. Boron carbide is the third hardest material known and the hardest material produced in tonnage. Boron carbide is also the lightest of the ceramic materials, and therefore may be used to improve the mechanical properties of a metal matrix composite material without increasing the weight of the metal matrix material.

OBJECTS AND SUMMARY OF THE INVENTION

In view of the aforementioned shortcomings of conventional rigid disk substrates, it is an object of the present invention to provide a substrate for magnetic recording media formed of a boron carbide-metal matrix composite, the substrate being particularly suitable for use in magnetic recording disks for hard disk drives.

It is another object of the present invention to provide a rigid disk substrate that has substantially no significant resonance characteristics at disk rotation speeds from 0 through 12,000 rpm.

It is yet another object of the present invention to provide a rigid disk substrate that can be easily machined to have proper surface requirements and yet has a hardness that can withstand head slaps of 1000 G.

It is also an object of the present invention to provide a rigid disk substrate formed of a boron carbide-metal matrix composite, where the substrate is compatible with standard thin film deposition processes for magnetic recording disks.

It is a further object of the present invention to provide a magnetic recording disk having a rigid disk substrate formed of a boron carbide-metal matrix composite, a nickel-phosphorous layer, magnetic recording layer, and a protective coating layer.

It is furthermore another object of the present invention to provide a magnetic recording disk having a rigid disk substrate formed of a boron carbide-metal matrix composite, a magnetic recording layer, and a protective coating layer.

According to an aspect of the present invention, a rigid disk substrate is made of a boron carbide-metal matrix composite wherein the metal matrix material is aluminum or an aluminum alloy. The composite is formed by blending dry powders of boron carbide and the metal matrix material to uniformly mix the powders, and then subjecting the powders to high pressures to transform the powders into a solid ingot that can be extruded, cast, forged, and manufactured into rigid disk substrates for magnetic recording disks. Such disks can be rotated from 0 through 12,000 rpm and exhibit negligible resonance characteristics.

According to another aspect of the present invention, a magnetic recording disk is formed of a rigid disk substrate made from a boron-carbide metal matrix composite, a nickel-phosphorous layer deposited on the rigid disk substrate, a magnetic recording layer deposited on the nickel-phosphorous layer, and a protective overcoat covering the magnetic recording layer.

According to yet another aspect of the present invention, a magnetic recording disk is formed of a rigid disk substrate made from a boron-carbide metal matrix composite and a magnetic recording layer covering the rigid disk substrate.

The boron carbide-metal matrix composites of the present invention, unlike that of other metal matrix composites, is not formed through molten processes but by dry-blending boron carbide powder with the powder of the metal matrix material to uniformly mix the powders. After the powders are sufficiently mixed, they are subjected to high pressures to transform the powders into a solid ingot of a boron carbide-metal matrix composite. Such composites can be 60% lighter, 30% stronger, 45% stiffer, and 50% higher in fatigue strength than any of the 7000-series aluminum alloy materials. In addition, these composites can be 8% lighter, 26% stronger, 5% stiffer, and have 40% greater fatigue strength than most other metal matrix composites available. Further, these composites can exhibit a tensile strength of about 62 to 108 kpsi, a yield strength of about 58 to 97 kpsi, and a modulus of elasticity of about 14.25 to 14.50 Mpsi. Furthermore, these composites can be approximately as hard as chromoly steel but have a density that is lower than aluminum or its alloys. Such composites are also readily extrudable and machinable.

DETAILED DESCRIPTION OF PREFERRED EMBODIMENTS

Figure 1:
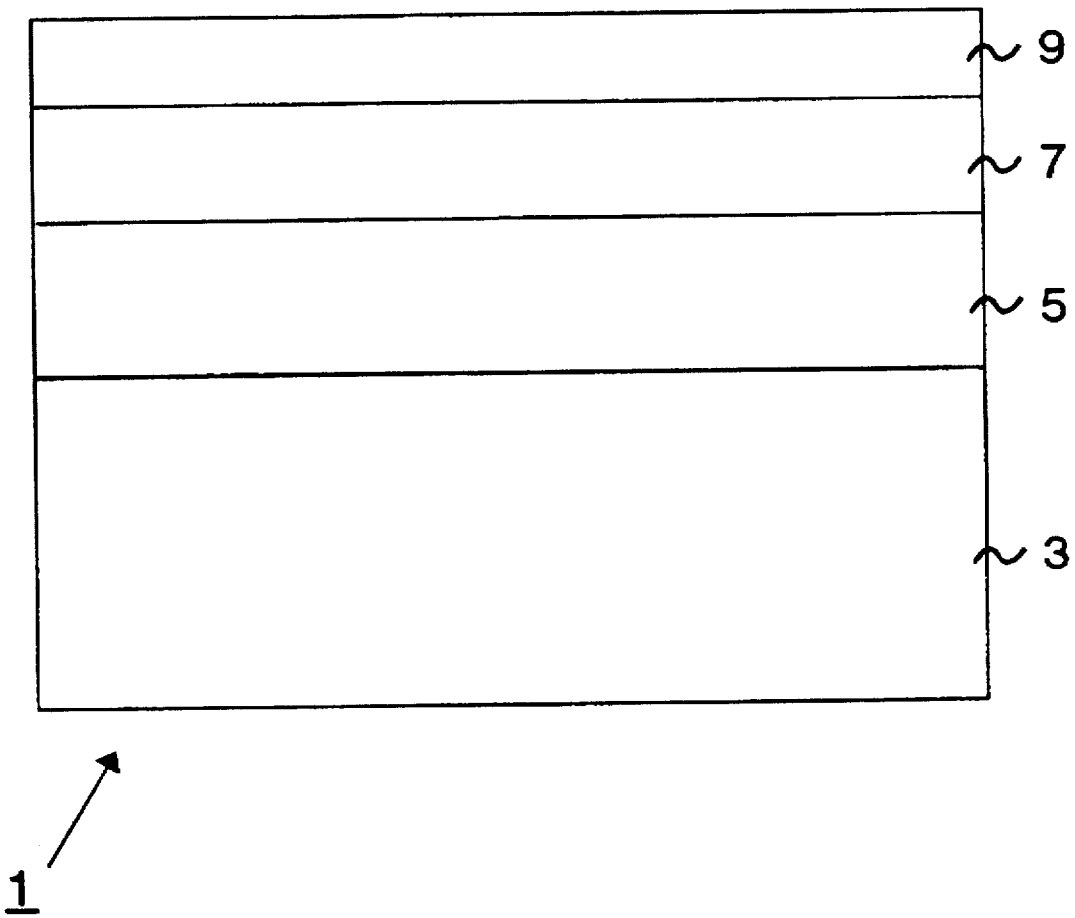
FIG. 1 is an elevational view of a cross section of a conventional magnetic recording disk.

Preferred embodiments of the present invention are described below with reference to the accompanying drawings, in which like reference numerals represent the same or similar elements.

In one embodiment of the present invention, a rigid disk substrate is formed of a boron carbide-metal matrix composite wherein the metal matrix material is aluminum or an aluminum alloy having a purity of approximately 97% when in powder form. The balance of the metal matrix material may contain trace amounts of various elements such as chromium, copper, iron, magnesium, silicon, titanium, and zinc. The boron carbide powder used in forming the composite has a purity of 99.5% and a particulate size typically in the range of 2 to 19 μm with a mean or average particulate size of about 5 to 8 μm. The boron carbide can be characterized as $B_4C$ and is comprised of approximately 77% boron and 22% carbon by weight.

The composite is formed by blending the metal matrix powder material with boron carbide ceramic powder material. Included in the boron carbide powder is 0.1 to 0.4 weight % silicon, 0.05 to 0.4 weight % iron, and 0.05 to 0.4 weight % aluminum, which is added during the production of boron carbide to improve the boron carbide for use in the metal matrix composite. These elements are usually present in an amount less than 3.0% by weight and do not go out of solution but instead remain with the boron carbide during subsequent processing of the metal matrix composite. These additives improve the chelating properties of the metal matrix material by forming intermetallic bonds with the metal matrix material. Trace amounts of magnesium, titanium, and calcium may also be included.

Two exemplary semi-quantitative analyses of acceptable boron carbide powders for use in the present invention are shown hereinbelow in Tables I and II. However, it will be understood that the aforementioned additions of pure aluminum, silicon, and iron, may not be the only metals that can be used for the stated purpose. By way of example, virtually any low temperature metal that forms an intermetallic phase below the processing temperature of the metal matrix composite ingot could be used in the present invention for the purpose indicated.

TABLE I

| B | 77.3% |
|---|---|
| Si | 0.37 |
| Mg | 0.0016 |
| Fe | 0.026 |
| Al | 0.18 |
| Cu | 0.0021 |
| Ti | 0.0088 |
| Ca | 0.0049 |
| other elements | (nil) |
| C, $O_2$ | (bal) |

TABLE II

| B | 77.7% |
|---|---|
| Si | 0.14 |
| Mg | 0.0017 |
| Fe | 0.074 |
| Al | 0.13 |
| Cu | ND 0.0002 |
| Ti | 0.017 |
| Ca | 0.0048 |
| other elements | (nil) |
| C, $O_2$ | (bal) |

A typical relative weight contribution of the boron carbide powder and metal matrix material powder is approximately 1 to 40% boron carbide and 60 to 99% metal matrix.

Figure 2:
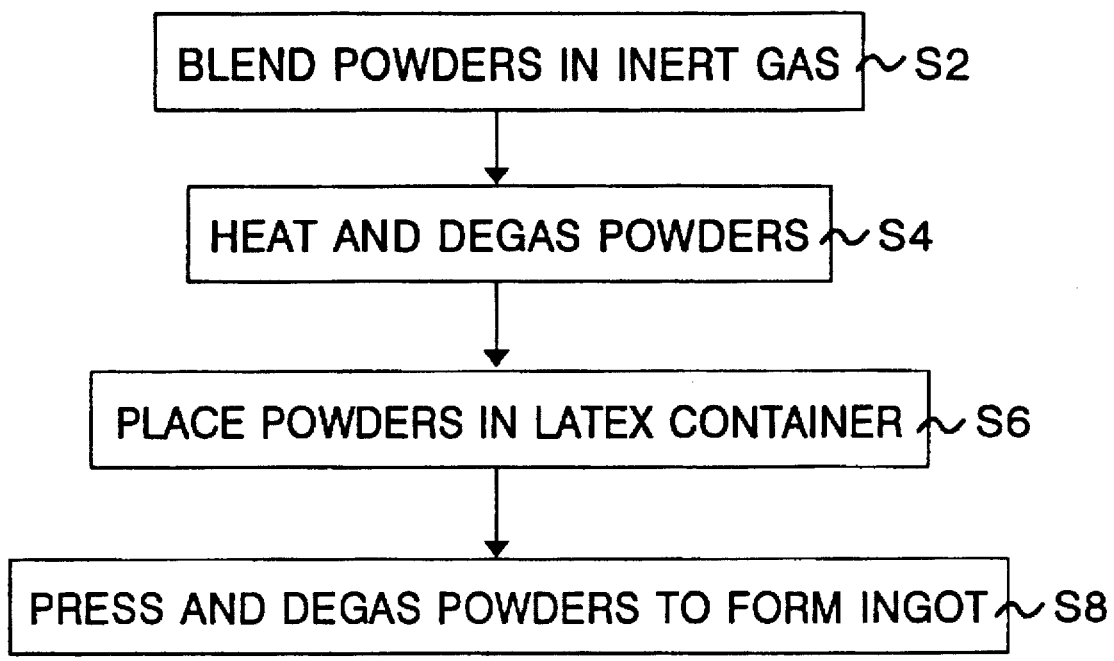
FIG. 2 is a flow chart describing a process of consolidating the powder constituents of the composite according to an embodiment of the present invention.

As described in the flow chart of FIG. 2, after the boron carbide powder and the aluminum or aluminum alloy powder are blended together for about 2.5 hours at 20 to 30 rpm in an inert gas at step S2, the powders are degassed at 200° C. for about 1 hour in a vacuum of approximately 5 to 8 Torr at step S4 and then placed in a latex bag at step S6 and isostatically pressed at 65,000 psi. The latex bag is degassed and clamped off, and the pressure is held at this value for at least 1 minute at step S8. The resulting ingots are then removed from the bag and placed into a vacuum furnace to undergo a sintering cycle, as described immediately below.

Figure 3:
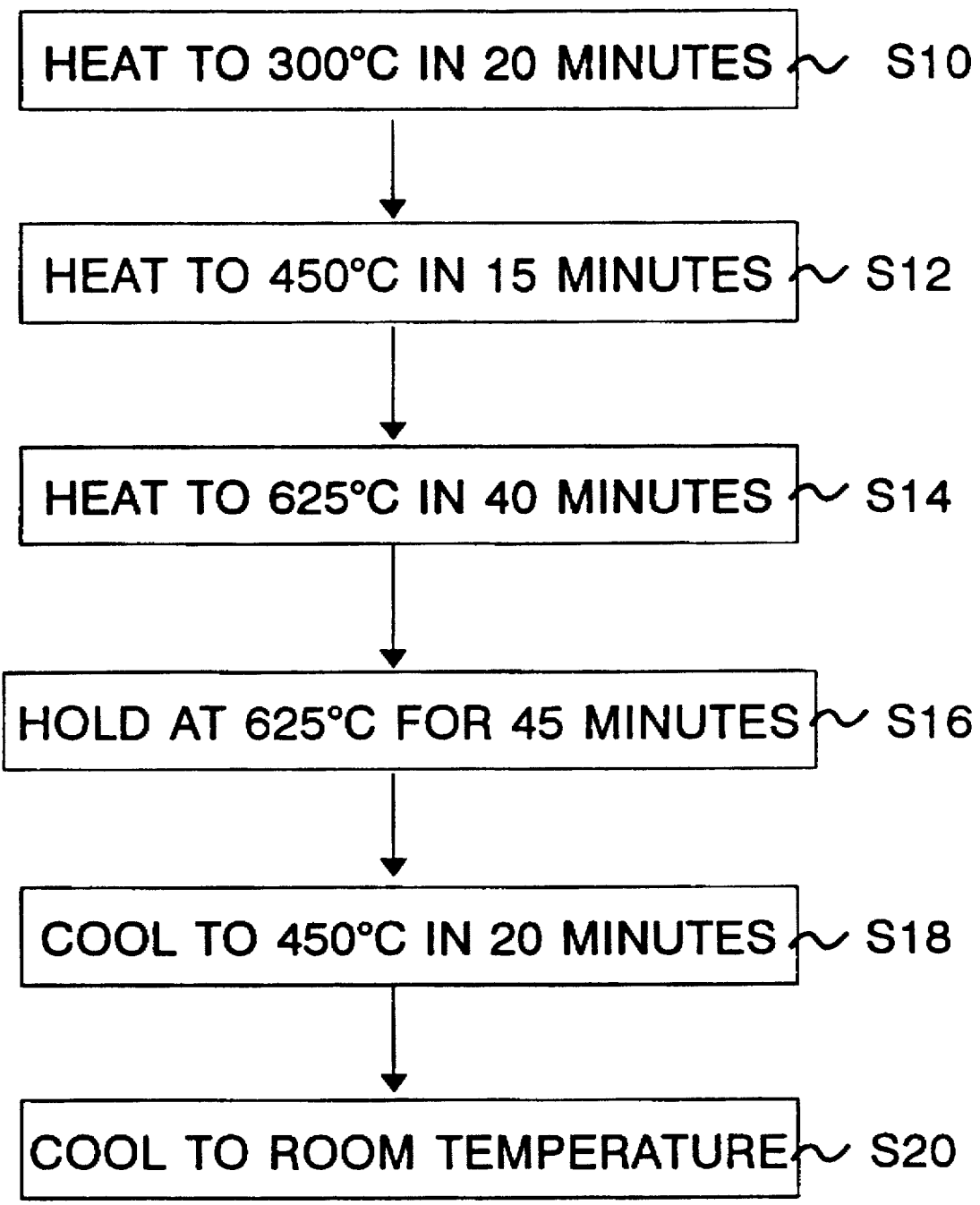
FIG. 3 is a flow chart describing a process of sintering the consolidated powders into an ingot of the metal matrix composite.

As described in the flow chart of FIG. 3, the ingots are heated at step S10 from room temperature to 300° C. during a 20 minute ramp period to burn off binder and water. The ingots are then heated at step S12 to 450° C. during a 15 minute ramp period to burn off any remaining binder. Subsequently, the ingots are heated at step S14 to 625° C. during a 40 minute ramp period and held at 625° C. at step S16 for 45 minutes. During this time close grain boundaries are formed. The ingot is then cooled at step 18 from 625° C. to 450° C. in 20 minutes using a nitrogen gas backfill. Finally, at step S20 the ingots are cooled to room temperature at a rate less than or equal to 40° C. per minute using nitrogen gas. The resulting boron carbide-metal matrix composite material has a density ranging from approximately 2.5 to 2.8 g/cm$^3$ depending on the type of aluminum alloy used or whether aluminum is used for the metal matrix material. The composite material is then machined to meet the tolerances and specifications of rigid disk substrates using standard machining tools.

Figure 4:
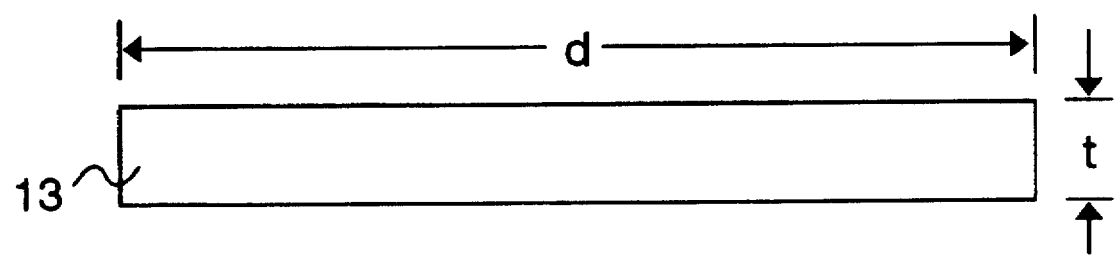
FIG. 4 is an elevational view of a cross section of a rigid disk substrate according to an embodiment of the present invention.

FIG. 4 schematically shows an elevational cross section of a rigid disk substrate 13 according to the present invention. The diameter d of the substrate 1 can be 3.5, 2.5, or 1.8 inches to conform with standard sizes for rigid disk substrates. The thickness t of the substrate 13 is less than 1 mm and preferably less than approximately 0.6 mm. The rigid disk substrate 13 can be rotated from 0 through 12,000 rpm with negligible resonance characteristics, and therefore can be routinely operated at any rotation speed between 0 and 12,000 rpm without excessive head slap caused by resonance of the substrate 13.

Figure 5:
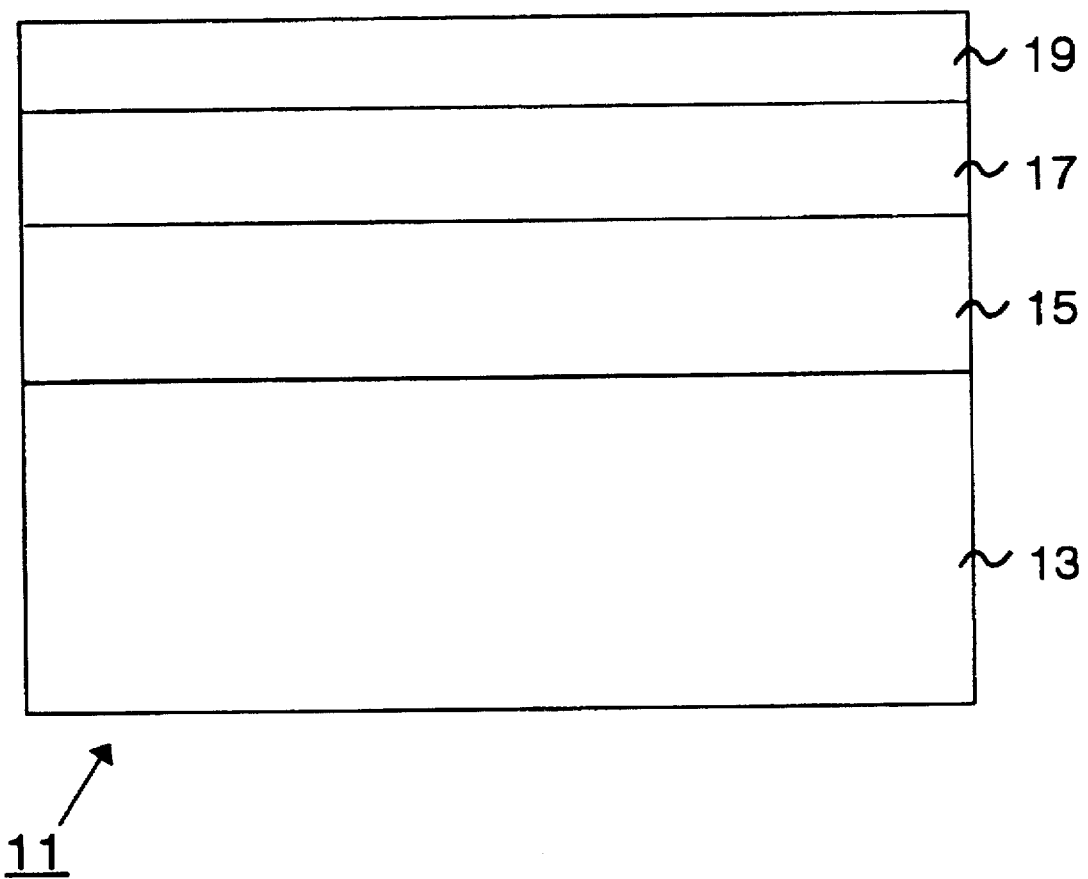
FIG. 5 is an elevational view of a cross section of a magnetic recording disk according to an embodiment of the present invention.

In another embodiment of the present invention, a magnetic recording disk 11, schematically shown in FIG. 5, is comprised of a rigid disk substrate 13 formed of a boron carbide-metal matrix composite, a nickel phosphorous layer 15 overlaying the substrate 13, a magnetic recording layer 17 covering the nickel-phosphorous layer 15, and a protective coating layer 19 covering the magnetic recording layer 17. The nickel-phosphorous layer 15 is approximately 10 to 20 μm thick and is deposited onto the substrate 13 by plating. The deposited nickel-phosphorous layer 15 is polished and textured to produce a grooved surface that assists and improves head aerodynamics. The magnetic recording layer 17 is a thin film of a cobalt-based alloy such as cobalt-platinum-chromium having a thickness of approximately 200 to 500 nm. Other magnetic material of sufficiently high storage density may also be used for the magnetic recording layer 17. The protective coating layer 19 is deposited to a thickness of approximately 10 to 50 nm to protect the magnetic recording layer 17. The protective coating layer 19 may be a sputter-deposited carbon layer or it may be any other non-magnetic hard coating.

Figure 6:
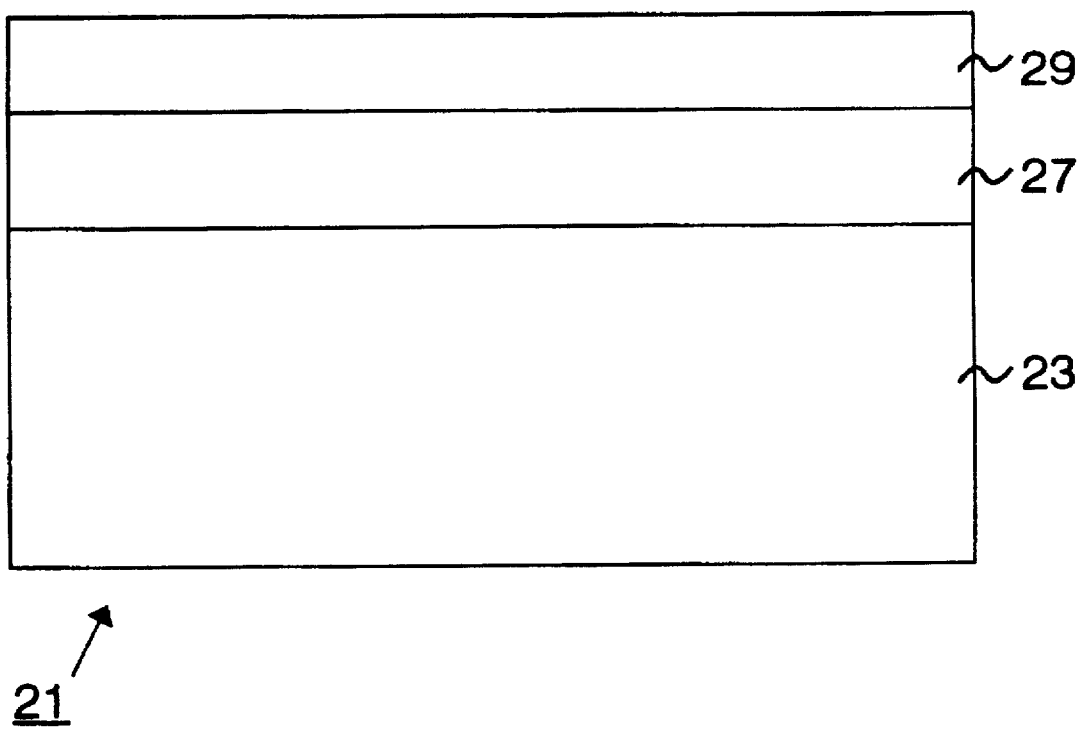
FIG. 6 is an elevational view of a cross section of a magnetic recording disk according to another embodiment of the present invention.

In yet another embodiment of the present invention, as schematically shown in FIG. 6, a magnetic recording disk 21 is comprised of a rigid disk substrate 23 formed of a boron carbide-metal matrix composite, a magnetic recording layer 27 covering the substrate 23, and an optional protective coating layer 29 covering the magnetic recording layer 27. Instead of having a nickel-phosphorous layer, the substrate 23 itself is polished and textured to produce a grooved surface to assist and improve head aerodynamics. The magnetic recording layer 27 is a thin film of a high storage-density magnetic material. The optional protective coating layer 29 is a non-magnetic hard coating such as sputtered carbon and may be omitted because the rigid disk substrate exhibits negligible resonance characteristics at rotation speed from 0 through 12,000 rpm and therefore the magnetic recording disk will experience few, if any, head slaps.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A substrate for magnetic disk recording media, comprising:

a boron carbide-metal matrix composite disk having a density ranging from about 2.5 to 2.8 g/cm$^3$ and a composition ranging from about 1 to 40 weight % of boron carbide and about 60 to 99 weight % of metal matrix, wherein the metal matrix is comprised of aluminum or an aluminum alloy, the boron carbide-metal matrix composite disk has a thickness less than about 1 mm, and the boron carbide-metal matrix composite is formed by a process that does not require melting of the aluminum or aluminum alloy metal matrix.

2. A substrate for magnetic disk recording media according to claim 1, wherein the thickness is less than 0.6 mm.

3. A substrate for magnetic disk recording media according to claim 1, wherein the boron carbide-metal matrix composite is formed by steps including:

blending dry powders of boron carbide and aluminum or aluminum alloy metal matrix material to uniformly mix the powders;

consolidating the powders to form an ingot; and sintering the ingot.

4. A substrate for magnetic disk recording media according to claim 3, wherein the boron carbide powder includes one or more metal elements added to improve the chelating properties of the aluminum or aluminum alloy metal matrix material by forming intermetallic bonds with the metal matrix material.

5. A magnetic recording disk comprising:

a rigid disk substrate comprised of a boron carbide-metal matrix composite, the metal matrix comprising aluminum or an aluminum alloy;

a nickel-phosphorous layer on the rigid disk substrate;

a magnetic recording layer on the nickel-phosphorous layer; and a protective coating on the magnetic recording layer, wherein the boron carbide-metal matrix composite is formed by a process that does not require melting of the aluminum or aluminum alloy metal matrix.

6. A magnetic recording disk according to claim 5, wherein the boron carbide-metal matrix composite has a density ranging from about 2.5 to 2.8 g/cm$^3$ and a composition ranging from about 1 to 40 weight % of boron carbide and about 60 to 99 weight % of metal matrix.

7. A magnetic recording disk according to claim 5, wherein the rigid disk substrate has a thickness less than or equal to approximately 0.6 mm.

8. A magnetic recording disk according to claim 5, wherein the magnetic recording layer is comprised of a cobalt-based material, and the protective layer is comprised of a carbon-based material.

9. A magnetic disk recording medium comprising:

a rigid disk substrate comprised of a boron carbide-metal matrix composite, the metal matrix comprising aluminum or an aluminum alloy; and a magnetic recording layer supported by the rigid disk substrate, wherein the boron carbide-metal matrix composite has a density ranging from about 2.5 to 2.8 g/cm$^3$ and a composition ranging from about 1 to 40 weight % of boron carbide and about 60 to 99 weight % of metal matrix, the boron carbide-metal matrix composite is formed by a process that does not require melting of the aluminum or aluminum alloy metal matrix, and the rigid disk substrate is textured to improve and assist head aerodynamics.

* * * * *